Dec. 18, 1928.
1,695,829
J. T. TAUDVIN
SUSPENSION DEVICE FOR PUNCHING BAGS
Filed Oct. 21, 1926
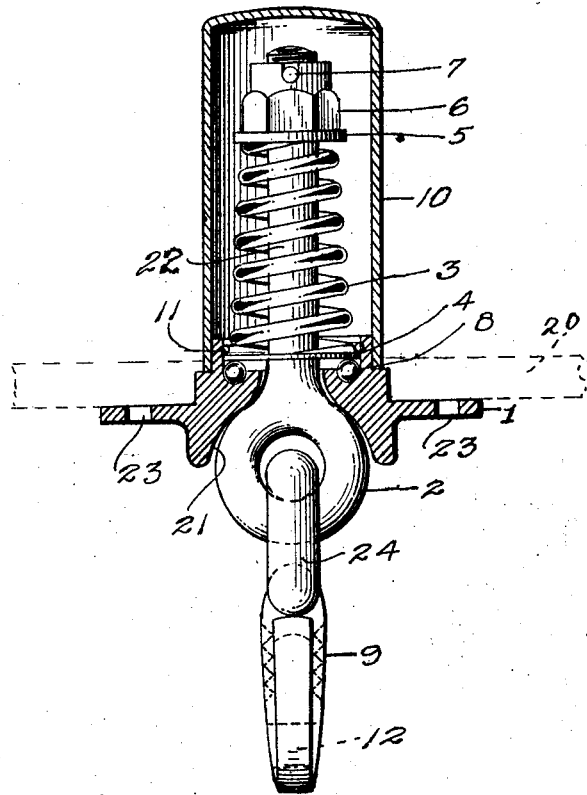
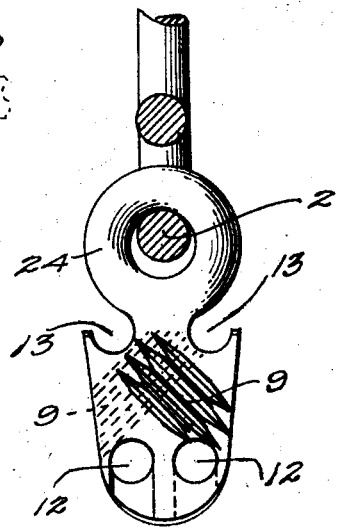
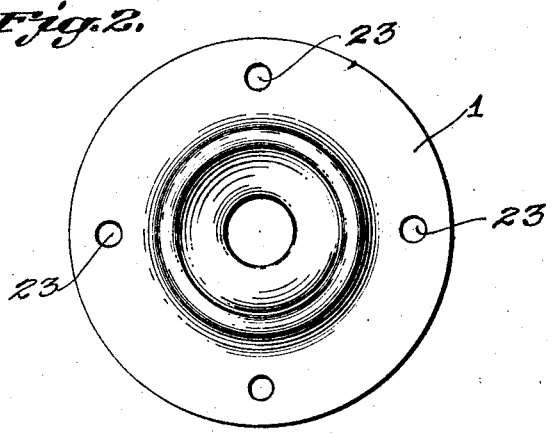
Joseph Theodore Taudvin
INVENTOR.

Patented Dec. 18, 1928.

1,695,829

UNITED STATES PATENT OFFICE.

JOSEPH THEODORE TAUDVIN, OF NEW YORK, N. Y.

SUSPENSION DEVICE FOR PUNCHING BAGS.

Application filed October 21, 1926. Serial No. 143,285.

This invention relates to suspension devices for punching bags, and with respect to its more specific features, to supports for rope suspended punching bags.

Among the objects of the invention are:— the provision of a practical device, by use of which the life of the rope is greatly increased; in which injurious twisting of the rope is eliminated and in which the shock on the rope, due to the blows of punching, is cushioned effectively, and sudden strain on the rope greatly lessened.

Other objects of the invention will be in part obvious and will in part appear hereinafter.

The invention accordingly comprises an apparatus possessing the features, properties, and the relation of elements which will be exemplified in the apparatus hereinafter described and the scope of the application of which will be indicated in the claims.

For a fuller understanding of the nature and objects of the invention, reference should be had to the following detailed description taken in connection with the accompanying drawings, in which Fig. 1 is a vertical section through the rope suspension device.

Fig. 2 illustrates a supporting member in plan, and

Fig. 3 is a detail of the rocker connection.

The suspending device of the present invention includes means whereby the punching bag rope is resiliently suspended from its support so as to have free rotary movement relative to said support, the shock on the rope due to punching being absorbed by a cushion which is included in the rope suspending device. Each of these means contributes to the improvement herein referred to, and the association thereof, one with another, whether in their broad or in their specific aspect, provides a rope suspending device possessing distinct advantages and improvements as compared with prior types.

Referring now more specifically to the drawing, the support for the bag may include the plate, or swivel flange 1, which is fastened to the underside of the drum 20, the underside of the swivel flange having a round, circular cup-like recess 21, within which is received the eye 2 of the swivel pin 22, these parts being conveniently provided by an eye-bolt, as illustrated. In the upper face of the flange 1 is a ball race, in which lie the ball bearings 8. The numeral 4 indicates a bearing washer, which rests upon the ball bearings 8, and is retained thereon by the retaining spring 11, seated in a shallow groove in the side wall of a recess of the swivel flange. The stem 22 of the swivel pin passes through the retaining washer 4 and axially through the helical spring 3, the lower end of the spring resting upon the washer 4. Upon the upper end of the spring 3 rests the retaining washer 5, through which the stem 22 also passes, the upper end of the stem being screw-threaded for reception of the nut 6 outside the retaining washer 5, the nut being held by cotter-pin 7, from coming off the pin 22. Upstanding from the flange 1 is the case or cover 10, which encloses the shaft of the swivel pin, and the spring 3. By adjusting the nut 6 up or down on the shaft 22, the tension of the spring 3 may be made more or less, as desired. The swivel flange 1 may be bolted or otherwise fastened to the drum 20 through the holes 23 provided for that purpose. It will be noted that the swivel pin and the spring 3 are supported on the balls 8 for simultaneous swivel or rotary movement, relative to the support, and that the swivel pin is axially movable and resiliently restrained from axial movement, the spring 3 serving to cushion the pin against shock imparted thereto by blows on the bag.

Numeral 24 indicates a rocker member, having an eye for engaging and rocking on the eye 2 of the swivel pin, and a flat web depending from the eye 24, such web having two rope-receiving holes 12 therethrough, and two shoulders 13, above the holes 12 and at opposite sides of the vertical axis of the rocker. The opposite flat faces of the rocker member 24 are provided with corrugations or teeth 9, for the purpose of gripping the rope coming from the punching bag supported beneath the rocker. It will be understood that the rope may be looped through the ring in the bag, and the opposite ends of the rope passed, respectively, through the holes 12, one from one side and the other from the other side, and over the shoulders 13, in such a manner that one end of the rope will lie on one side of the web between the teeth 9 and the rope passing thereover. Thus the respective ends of the rope will be pressed against the teeth 9 and securely gripped to the rocker member so as to be restrained from slipping. In operation, when the bag is punched, the shock imparted to the rope causes the rocker member to rock on the eye 2 of the swivel, and the shocks on the rope due to the punching blows, or to the striking of the bag on the under face of the drum 20, or to the dropping of the bag, are cushioned by the spring 3, the swivel being resiliently suspended on the support by means of the spring 3. Spinning of the bag will result in the tendency to twist the rope, but the swivel will thereupon freely rotate, or spin, on the ball bearings 8, so that the twist of the rope will be relatively slight, if any at all. Although the momentum and tendency to twist of the bag may be large, twisting of the rope to an injurious extent is practically eliminated, and any sudden tension on the rope is effectively cushioned, with the result that the life of the rope is greatly prolonged. Thus by the above described construction are accomplished, among others, the objects hereinbefore referred to.

Having described my invention, what I claim as new and desire to secure by Letters Patent is:

1. In combination, in a suspension for a rope suspended punching bag, a support and a punching bag rope resiliently suspended from said support, said rope having free rotary movement relative to said support, the suspending means for said rope including a suspended, rope attaching rocker having a relatively flat web, said web having two rope receiving holes therethrough, and shoulders at opposite sides of its vertical axis and above said holes.

2. In combination, in a suspension for a rope suspended punching bag, a support, an axially movable rope suspending swivel-pin rotative on said support, and a spring disposed resiliently to restrain axial movement of said pin engendered by blows on said bag, a ball race on said support, a bearing washer resting on ball bearings in said race, said pin passing through said washer, a retaining washer, said spring disposed between said two washers and resting on said bearing washers and comprising a helix through which said pin passes, and a nut threaded on said pin outside said retaining washer.

In testimony whereof I affix my signature.

JOSEPH THEODORE TAUDVIN.